United States Patent [19]
Rink et al.

[11] Patent Number: 5,857,699
[45] Date of Patent: Jan. 12, 1999

[54] ADAPTIVE OUTPUT FLUID FUELED AIRBAG INFLATOR

[75] Inventors: Karl K. Rink, Liberty; G. Dean Mossi, Roy; Bradley W. Smith, Ogden; David J. Green, Brigham City, all of Utah

[73] Assignee: Autoliv ASP, Inc., Ogden, Utah

[21] Appl. No.: 810,118

[22] Filed: Feb. 25, 1997

[51] Int. Cl.$^6$ .................................................. B60R 21/26
[52] U.S. Cl. .......................................... 280/737; 280/711
[58] Field of Search .................... 280/741, 736, 280/737, 735

[56] References Cited

U.S. PATENT DOCUMENTS

| | | | |
|---|---|---|---|
| 3,773,352 | 11/1973 | Radke | 280/731 |
| 3,773,353 | 11/1973 | Trowbridge et al. | 280/737 |
| 3,854,491 | 12/1974 | Bryan et al. | 137/1 |
| 3,868,124 | 2/1975 | Johnson | 280/737 |
| 3,868,126 | 2/1975 | Radke et al. | 280/737 |
| 3,905,515 | 9/1975 | Allemann | 222/3 |
| 3,930,666 | 1/1976 | Lynch et al. | 280/737 |
| 3,961,806 | 6/1976 | Katter | 280/732 |
| 3,966,228 | 6/1976 | Neuman | 280/737 |
| 3,972,545 | 8/1976 | Kirchoff et al. | 280/735 |
| 4,018,457 | 4/1977 | Marlow | 280/735 |
| 5,016,914 | 5/1991 | Faigle et al. | 280/737 |
| 5,022,674 | 6/1991 | Frantom et al. | 280/741 |
| 5,060,973 | 10/1991 | Giovanetti | 280/736 |
| 5,074,583 | 12/1991 | Fujita et al. | 280/735 |
| 5,219,178 | 6/1993 | Kobari et al. | 280/736 |
| 5,242,194 | 9/1993 | Popek | 280/737 |
| 5,263,740 | 11/1993 | Frey et al. | 280/737 |
| 5,323,243 | 6/1994 | Cheon | 358/335 |
| 5,346,249 | 9/1994 | Hallard et al. | 280/728 B |
| 5,351,988 | 10/1994 | Bishop et al. | 280/737 |
| 5,378,018 | 1/1995 | Ketterer et al. | 280/737 |
| 5,407,226 | 4/1995 | Lauritzen et al. | 280/728 R |
| 5,470,104 | 11/1995 | Smith et al. | 280/737 |
| 5,494,312 | 2/1996 | Rink | 280/737 |
| 5,531,473 | 7/1996 | Rink et al. | 280/737 |
| 5,582,428 | 12/1996 | Buchannan et al. | 280/741 |
| 5,613,702 | 3/1997 | Goetz | 280/735 |
| 5,660,412 | 8/1997 | Renfroe et al. | 280/737 |
| 5,664,802 | 9/1997 | Harris et al. | 280/736 |
| 5,762,368 | 6/1998 | Faigle et al. | 280/737 |

*Primary Examiner*—Kenneth R. Rice
*Attorney, Agent, or Firm*—Sally J. Brown

[57] ABSTRACT

An improvement in an airbag system for a motor vehicle relating to an adaptive output fluid fueled airbag inflator and method of operation thereof are provided. Such an inflator, in addition to a stored gas chamber, a combustion chamber wherein, upon actuation, a first fluid fuel and an oxidant are burned, and a first initiator device for initiating the combustion of the first fuel and the at least one oxidant, includes a combination of a fluid fuel container, which holds a supply of a second fluid fuel, and a second initiator device for initiating the combustion of the second fuel. Various selected performance levels can be obtained through the proper selection, actuation and sequencing of actuation of the initiator devices and burning of fuels contained within the inflator.

23 Claims, 5 Drawing Sheets

ADAPTIVE OUTPUT FLUID FUELED AIRBAG INFLATOR

BACKGROUND OF THE INVENTION

This invention relates generally to an apparatus, commonly referred to as an inflator, for use in inflating an inflatable device such as an inflatable vehicle occupant restraint of a respective inflatable restraint system. More specifically, the invention relates to an inflator device containing a fluid fuel material adapted to be burned to produce gaseous inflation products and which inflator device has an inflation output adaptive to selected operating conditions and parameters.

Various arrangements are known in the art whereby inflatable restraints, e.g., airbags, are used to protect an occupant of an automotive vehicle, in the event of a collision. In addition, various inflatable restraint system arrangements have been proposed wherein the inflation of an airbag is adjusted based on factors such as, for example, the speed of deceleration of the vehicle and seat belt usage by the occupant.

For example, U.S. Pat. No. 5,323,243 discloses an occupant sensing apparatus for use in an occupant restraint system. The disclosed sensing apparatus preferably monitors the passenger seat in the vehicle to detect the presence, position and weight of an object on the seat. A control algorithm is performed to control inflation of the airbag, responsive to the detected values.

U.S. Pat. No. 5,074,583 discloses an airbag system for an automobile including a seating condition sensor that detects a seating condition of a passenger with respect to seat position, reclining angle, as well as passenger size and posture. The invention seeks to operate the airbag system in accordance with the seating condition of the passenger such that the inflated bag is brought into optimal contact with the occupant.

In addition, many types of inflator devices have been disclosed in the art for the inflation of an airbag such as used in inflatable restraint systems. One such type of inflator device involves the utilization of a quantity of stored compressed gas which is selectively released to inflate an airbag. To properly inflate a typical airbag at an appropriate rate, this type of inflator device commonly requires the storage of a relatively large volume of gas at a relatively high pressure. As a result of the utilization of high storage pressures, the walls of the gas storage chamber of the inflator are typically relatively thick for increased strength. The combination of large storage volume and thick storage chamber walls results in a relatively heavy and bulky inflator design.

Another type of inflator device derives inflation gas from a combustible gas generating material which, upon ignition, generates a quantity of gas sufficient to inflate the airbag. Gas generating materials effective to produce inflation gas in the rates and quantities required in such applications may, however, produce various undesirable combustion products, including various solid particulate, e.g., residue, materials. The removal of such solid particulate materials, such as by the incorporation of a filtering device within or about the inflator, can undesirably increase the complexity of either or both inflator design and processing and can also increase the costs associated therewith.

In addition, the temperature of the gaseous emission of such inflator devices can typically vary between about 500° F. (260° C.) and 1200° F. (649° C.), dependent upon numerous interrelated factors including the desired level of inflator performance, as well as the type and amount of gas generant used therein, for example. Consequently, airbags used in conjunction with such inflator devices are typically constructed of or coated with a material resistant to such high temperatures. For example, in order for an airbag to resist or avoid suffering having a hole burned through the airbag fabric as a result of exposure to such high temperatures, it is common airbag construction to include a coating of neoprene or one or more neoprene coated patches can be placed at the locations of the airbag on which the hot gas will initially impinge. As will be appreciated, such specially fabricated or prepared airbags are typically more costly to manufacture and produce.

Further, while vehicular inflatable restraint systems are preferably designed to be properly operational over a broad range of conditions, the performance of inflator devices of such design can be particularly sensitive to changes in ambient conditions, especially changes in temperature. For example, operation at very low temperatures, such as temperatures of −40° F. (−40° C.), can affect the performance of various propellants, and thus undesirably lower airbag pressure resulting from an inflator which contains a fixed available amount of propellant.

A third type of inflator device forms airbag inflation gas from a combination of stored compressed gas and the combustion of a solid form of a pyrotechnic gas generating material. This type of inflator device is commonly referred to as a hybrid inflator. Hybrid inflators that have been proposed heretofore often have been subject to certain disadvantages. For example, inflator devices of such a design typically result in a gas having a relatively high particulate content.

Various specific inflator devices and assemblies have been proposed in the prior art. U.S. Pat. No. 5,263,740 discloses an assembly wherein within a single chamber is housed both an inflation gas and a first ignitable material, which is subsequently ignited therein.

The housing of both an inflation gas and an ignitable material within a single chamber can result in production and storage difficulties. For example, concentration gradients of such components, both initially and over time as the device awaits actuation, can increase the potential for the release therefrom of ignitable material into the airbag prior to complete ignition, as well as increasing the relative amount of incomplete products of combustion released into the associated airbag.

A new type an inflator, called a "fluid fueled inflator," has been developed. Such inflators are the subject of commonly assigned U.S. Pat. No. 5,470,104, Smith et al., issued Nov. 28, 1995; U.S. Pat. No. 5,494,312, Rink, issued Feb. 27, 1996; and U.S. Pat. No. 5,531,473, Rink et al., issued Jul. 2, 1996, the disclosures of which are fully incorporated herein by reference.

Such an inflator device utilizes a fuel material in the form of a fluid, e.g., in the form of a gas, liquid, finely divided solid, or one or more combinations thereof, in the formation of an inflation gas for an airbag. In one such inflator device, the fluid fuel material is burned to produce gas which contacts a quantity of stored pressurized gas to produce inflation gas for use in inflating a respective inflatable device.

While such inflators avoid or minimize at least some of the above-identified shortcomings of prior inflator devices, there remains a need for an inflator device of simple design and construction, which is effectively operable using a variety of fuels, oxidants, and stored gases, and which, as compared to known inflation devices, can better vary output parameters such as the quantity, supply, and rate of supply of inflation gas, dependent on selected operating conditions such as ambient temperature, occupant presence, seat belt usage and rate of deceleration of the motor vehicle, for example.

SUMMARY OF THE INVENTION

General objects of the invention include providing one or more improved motor vehicle airbag systems, apparatuses for inflating inflatable devices and methods of operation for inflator apparatuses.

A more specific objective of the invention is to overcome one or more of the problems described above.

The general objects of the invention can be attained, at least in part, through an adaptive output inflator apparatus for inflating an inflatable device. The apparatus includes a first chamber wherein a supply of first fuel in the form of a fluid and at least one oxidant are burned to produce combustion products including hot combustion gas and to increase the temperature and pressure within the first chamber. The first chamber is adapted to open when a predetermined increase in pressure therewithin is realized, whereby at least a portion of the hot combustion gas is released from the first chamber.

The apparatus also includes a second chamber that contains a supply of pressurized stored gas. Upon the opening of the first chamber, the second chamber is in fluid communication therewith and the hot combustion gas released from the first chamber mixes with the pressurized stored gas to produce inflation gas and to increase the temperature and pressure within the second chamber. The second chamber is adapted to open when a predetermined increase in pressure therewithin is realized after the hot combustion gas released from the first chamber mixes with the pressurized stored gas to produce the inflation gas, whereby at least a portion of the inflation gas is released from the second chamber to inflate the inflatable device.

The apparatus further includes a first initiator device for initiating the combustion of the first fuel and the at least one oxidant. The apparatus still further includes a combination of a second container and a second initiator device. The second container holds a supply of a second fuel in the form of a fluid and is adapted to open to be in fluid communication with the first chamber. Upon activation, the second initiator device initiates the combustion of the second fuel.

The prior art fails to provide an inflator apparatus, an airbag system or a method of operation of an adaptive output airbag inflator in an airbag system for a motor vehicle which is as effective or efficient as desired in the production of airbag cushion inflation gas from a single source and at a rate and/or pressure selected from an as wide as desired range of possible responses and which, if desired, can be simply appropriately designed to provide an inflation gas output in a selected, limited number of discrete levels.

The invention further comprehends an improvement in an airbag system for a motor vehicle wherein the system includes at least one airbag module containing at least one inflatable airbag and sensor means for sensing at least one airbag system operating condition selected from the group of ambient temperature, occupant presence, seat belt usage and deceleration of the motor vehicle. The improvement relates to an adaptive output airbag inflator coupled to the airbag module for generating an adaptive output of inflation gas applied to the module.

Specifically, the adaptive output inflator includes a first chamber wherein a supply of a first fuel in the form of a fluid and at least one oxidant are burned to produce combustion products including hot combustion gas and to increase the temperature and pressure within the first chamber. The first chamber is adapted to open when a predetermined increase in pressure within the chamber is realized, whereby at least a portion of the hot combustion gas is released from the first chamber. Included in the inflator, is a first initiator device for initiating the combustion of the first fuel and the at least one oxidant.

The inflator also includes a second chamber which contains a supply of pressurized stored gas. The second chamber is in fluid communication with the first chamber upon the opening of the first chamber, with the hot combustion gas released from the first chamber mixing with the pressurized stored gas to produce inflation gas and to increase the temperature and pressure within the second chamber. The second chamber is adapted to open when a predetermined increase in pressure within the second chamber is realized after the hot combustion gas released from the first chamber mixes with the pressurized stored gas to produce the inflation gas, whereby at least a portion of the inflation gas is released from the second chamber to inflate the inflatable device.

The inflator still further includes a combination including: a second container for holding a supply of a second fuel in the form of a fluid and a second initiator device for initiating the combustion of the second fuel. The second container is adapted to open to be in fluid communication with the first chamber.

Upon receipt by the module of a first level output signal from the sensor means, the first initiator device is actuated to initiate the combustion of the first fuel and the supply of the second fuel is retained in the second container. Upon receipt by the module of a third level output signal from the sensor means, both the first and the second initiator devices are actuated to initiate the combustion of the first fuel and the second fuel, respectively.

The invention still further comprehends methods of operation of such adaptive output airbag inflators.

In accordance with one such method, in response to receipt by an airbag module coupled to the adaptive output airbag inflator of a first level output signal from a sensor means, the method includes the steps of: a) burning at least a portion of the first fuel and the at least one oxidant in the first chamber to produce combustion products including hot combustion gas and increasing the temperature and pressure within the first chamber, b) opening the first chamber when a predetermined increase in pressure within the first chamber is realized to release hot combustion gas from the first chamber into the second chamber, c) mixing the released hot combustion gas with the pressurized stored gas in the second chamber to produce inflation gas, and d) opening the second chamber when a predetermined increase in pressure within the second chamber is realized after the hot combustion gas released from the first chamber has mixed with the pressurized stored gas to produce the inflation gas, to release at least a portion of the inflation gas from the second chamber to inflate the inflatable device.

In response to receipt by the module of a third level output signal from the sensor means, the method includes the steps of: a) burning at least a portion of the first fuel and the at least one oxidant in the first chamber to produce combustion products including hot combustion gas and increasing the temperature and pressure within the first chamber, b) releasing the second fuel into the first chamber from the second container, c) burning at least a portion of the second fuel in the first chamber to produce additional combustion products including additional hot combustion gas, the burning of the first and the second fuels increasing the temperature and pressure within the first chamber, d) opening the first chamber when a predetermined increase in pressure in the first chamber is realized to release hot combustion gas from the first chamber into the second chamber, e) mixing the released hot combustion gas with the pressurized stored gas in the second chamber to produce inflation gas, f) opening the second chamber when a predetermined increase in pressure within the second chamber is realized, g) releasing combustion products produced from the burning of the first and the second fuels, from the first chamber into the second chamber, h) mixing the released combustion products with the pressurized stored gas in the second chamber to produce inflation gas, and I) opening the second chamber when a predetermined increase in pressure within the second chamber is realized to release at least a portion of the inflation gas from the second chamber to inflate the inflatable device.

The term "equivalence ratio" ($\phi$) is commonly used in reference to combustion processes. The equivalence ratio is defined as the ratio of the actual fuel to oxidant ratio $(F/O)_A$ divided by the stoichiometric fuel to oxidant ratio $(F/O)_S$:

$$\phi = (F/O)_A / (F/O)_S$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.) In general, for given temperature and pressure conditions, fuel and oxidant mixtures are flammable over only a specific range of equivalence ratios.

As used herein, references to a chamber or volume as being "free of combustion oxidant" are to be understood to refer to a chamber or volume sufficiently free of oxidant such that, over the range of pressures and temperatures experienced during the storage of the fluid fuel therein, the amount of heat liberated by chemical reaction (since the chemical reaction rate is non-zero for all temperatures) is less than the amount of heat dissipated to the surroundings. It will be appreciated that as the rate of such chemical reaction (and hence the amount of heat liberated upon reaction) is dependent on the concentration of oxidant as well as the temperature, the amount of heat liberated can be minimized through proper control of the quantity of oxidant initially present therein.

References to detection or sensing of "occupant presence" are to be understood to refer to and include detection and sensing of size, weight, and/or positions of the particular occupant under consideration.

Other objects and advantages will be apparent to those skilled in the art from the following detailed description taken in conjunction with the appended claims and drawings.

DETAILED DESCRIPTION OF THE INVENTION

Figure 1:
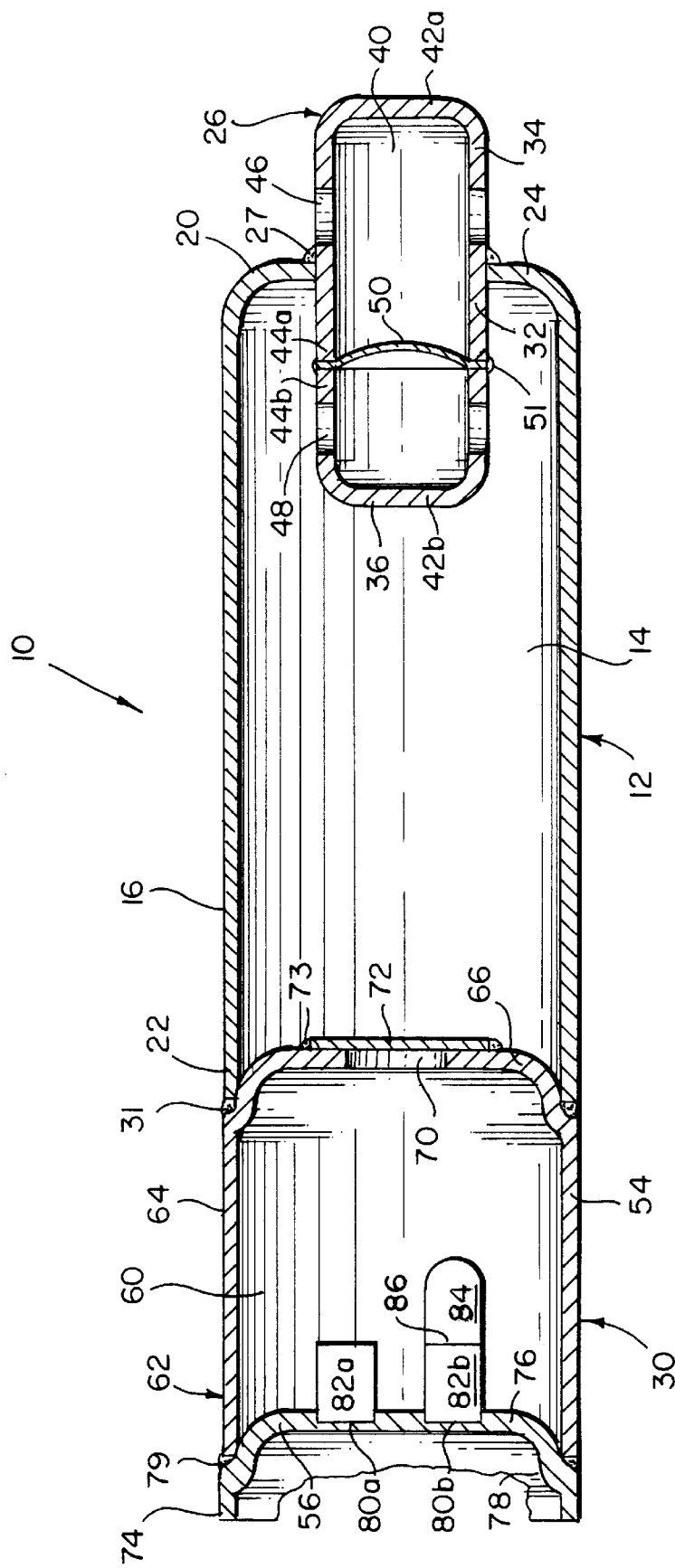
FIG. 1 is a simplified, partially in section, schematic drawing of an adaptive output fluid fueled airbag inflator in accordance with one embodiment of the invention.

An adaptive output fluid fueled passenger side airbag inflator, generally designated by the reference numeral 10 and in accordance with one embodiment of the invention, is shown in FIG. 1. It will be understood that the invention described hereinafter has general applicability to various types or kinds of airbag assemblies including, for example, driver side, passenger side, and side impact airbag assemblies such as for automotive vehicles including vans, pickup trucks, and particularly automobiles.

The inflator assembly 10 comprises a pressure vessel 12 including a chamber 14 that is filled and pressurized with a stored gas to a pressure typically in the range of 2000–5000 psi. Such stored gas typically comprises an inert gas such as argon, nitrogen or helium, for example, and, if desired, may also include an oxidant such as gaseous oxygen, for example. Thus, the chamber 14 is sometimes referred to herein as a "gas storage chamber."

The chamber 14 is defined by an elongated generally cylindrical sleeve 16, having a first and a second end, 20 and 22, respectively. The first end 20 is partially closed by means of an integral shoulder portion 24. A diffuser assembly 26 is attached by a circumferential weld 27 in sealing relation with the sleeve first end 20. A combustion chamber assembly 30 is attached by a circumferential weld 31 in sealing relation with the sleeve second end 22.

The diffuser assembly 26 comprises a generally cylindrical sleeve 32 having a cap portion 34 and a base portion 36 to define a diffuser chamber 40. Each of the diffuser assembly cap and base portions, 34 and 36, respectively, include a first end 42a and 42b, respectively, and an open second end 44a and 44b, respectively.

The diffuser assembly cap portion 34 includes a plurality of openings 46, adjacent the closed cap first end 42a, for dispensing and directing inflation gas from the inflator assembly into an airbag assembly (not shown). The diffuser assembly base portion 36 additionally includes a plurality of openings 48, adjacent the closed base first end 42b, for passage of contents from the storage chamber 14, into the diffuser chamber 40.

The diffuser assembly cap and base portions, 34 and 36, respectively, are aligned with the open second end of each, i.e., ends 44a and 44b, respectively, being closed by sealing means, e.g., by means of a rupture disc 50 abutting thereagainst. The diffuser assembly rupture disc 50 is joined in sealing relation with the diffuser assembly cap and base portions, 34 and 36, respectively, by means of a circumferential weld 51 at the periphery of the disc 50. In the static state, the disc 50 serves to separate the contents of the storage chamber 14 from the airbag.

The combustion chamber assembly 30 comprises a cap portion 54 and a base portion 56 to define a combustion chamber 60. Within the combustion chamber 60, as will be described in greater detail below, is stored a first one or more fluid fuels and one or more oxidants, forming a flammable mixture. In the practice of this aspect of the invention, the first one or more fuels and one or more oxidants are stored together such as in intimate contact and at relatively high pressure (e.g., in the range of about 500 to about 3000 psi (about 3.4 to about 20.7 MPa), preferably in the range of about 1600 to about 2200 psi (about 11.0 to about 15.2 MPa)). As with the gas stored in the storage chamber 14, the storage of gas within the combustion chamber 60 at relatively high pressures can advantageously help minimize the overall size of the inflator as well as minimize ignition delay, thereby resulting in higher and faster performance by the inflator assembly, as well as resulting in more complete combustion of the fuel material(s), such as through attainment of higher temperatures and, hence, increased reaction rates. In addition, such an inflator assembly can result in a reduction in or avoidance of the emission of incomplete products of combustion.

The combustion chamber cap portion 54 includes a sleeve 62, constituting a side wall 64 with a dome 66 joined thereto. The combustion chamber dome 66 includes an orifice, referred to herein as a gas exit opening 70. The gas exit opening 70 is normally closed by sealing means, e.g., by means of a rupture disc 72 joined in sealing relation with the combustion chamber dome 66 by means of a circumferential weld 73 at the periphery of the disc 72.

The combustion chamber dome 66 is generally designed to withstand the internal pressures generated upon the combustion of the flammable mixture within the combustion chamber 60. In the static state, the disc serves in maintaining the gas storage chamber 14 in a sealed condition.

The combustion chamber base portion 56 includes a base ring 74 with a cap 76 joined thereto via a base shoulder connecting portion 78. The base shoulder connecting portion 78 serves as a convenient means of locating the combustion chamber base portion 56 relative to the combustion chamber sleeve 62, as well as providing a location for a circumferential weld 79 whereby the combustion chamber assembly base portion 56 is attached in sealing relation with the combustion chamber cap portion 54.

The base cap 76 includes first and second openings, 80a and 80b, respectively, wherethrough first and second initiator devices, 82a and 82b, respectively, and described in greater detail below, are attached in sealing relation, such as with a weld, crimping or other suitable hermetic seal, within the combustion chamber 60.

The inflator assembly 10, within the combustion chamber 60, includes an inner housing 84. Within the inner housing 84, in the static state, there is stored or held a supply of at least a second one or more fluid fuels. The inner housing 84 is preferably arranged adjacent and proximate to the discharge end 86 of the second initiator device 82b such that upon actuation of the initiator device 82b, such as containing a charge of an igniter material, sufficient combustion products are produced and directed at the housing 84 to result in opening or rupturing thereof with at least a portion and, preferably, substantially all, of the second one or more fluid fuels held therein being released into the combustion chamber 60 for subsequent combustion.

The above-identified, commonly assigned U.S. Pat. No. 5,531,473, discloses a fluid fuel-containing initiator device that can advantageously be used to form the inner housing 84 of the inflator 10. Commonly assigned and herein incorporated patent application Ser. No. 08/572,452, filed on Dec. 14, 1995, discloses a containment assembly that can also advantageously be used to form the inner housing 84 of the inflator 10.

FUEL MATERIALS

The fluid fuels useable in such an apparatus include a wide range of gases, vapors, finely divided solids and liquids such that, when used with one or more suitable oxidants in proper proportion(s) at selected conditions (either alone or in conjunction with one or more inert gases) form a flammable mixture.

Such fluid fuels include hydrogen, as well as hydrocarbon-based fuels such as hydrocarbon and hydrocarbon derivative fuels. For example, such hydrocarbon fuels include those constituting naphthenic, olefinic and paraffinic hydrocarbon groups, particularly $C_1$–$C_4$ paraffinic hydrocarbon fuels. Suitable fuels that can be used in the practice of the invention include, for example; gasoline, kerosene, and octane. In addition, hydrocarbon derivative fuels such as those constituting various alcohols, ethers, and esters, for example, particularly those containing four or fewer carbon atoms and, in particular, alcohols such as ethyl and propyl alcohol can advantageously be used in the practice of the invention.

In general, the finely divided solid fuels useable in the practice of the invention must be of sufficient energy content and reactivity to heat the volume of stored gas to inflate the inflatable restraint device at the desired rate, without the inflator device being of an undesirable large size. Additionally, the fuel desirably produces no more than acceptable levels of combustion products, such as CO, NO, HCN, or $NH_3$, for example, which are or become toxic at sufficiently high concentrations.

The finely divided solid fuel useable in the practice of the invention can include one or more various powders or dusts such as those of:

a) carbonaceous materials such as coal and coal products (e.g., anthracite, bituminous, sub-bituminous, etc., such as with various volatile contents), charcoal, oil shale dust, and coke;

b) cottons, woods, and peat (such as various cellulosic materials including, for example: cellulose acetate, methylcellulose, ethylcellulose, and cellulose nitrate, as well as wood and paper dusts);

c) food feeds (such as flours, starches and grain dusts);

d) plastics, rubbers, and resins (such as epoxies, polyesters and polyethylenes); and e) metal and metal alloy materials (e.g., aluminum, magnesium, titanium, etc., as powders, grits, and/or shavings, in pure or compound form).

It is to be understood that such fuel can, if desired, be held in combinations with varying contents of liquid, vapor and combinations thereof of water.

Further, it will be appreciated that the finely divided solid fuels useable in the practice of the invention will typically include solid particles of varying size and shape. In general, however, the particle size of such finely divided solid fuel will typically vary in a range between about 5 to 500 microns and preferably in a range of about 10 to 125 microns, with mean particle sizes in the range of 10 to 40 microns. In practice, such sized finely divided solid fuels can desirably result in rapid and complete combustion, reducing or even eliminating the need for filtration of particulate from the corresponding inflator assembly design.

The use of finely divided solid fuels can result in various processing advantages. For example, such solid fuels, at least as compared relative to gaseous or liquid fuels, can simplify handling requirements and facilitate storage within an appropriate fuel storage chamber. Such facilitation in handling can, in turn, result in manufacturing cost reductions.

It will be appreciated that the fuel material, particularly fuel materials such as liquid hydrocarbons and liquid hydrocarbon derivatives (e.g., alcohols) may include therewith, in limited proportions, materials such as water that are normally not considered to be fuels. This is particularly true for those fuel materials for which complete water separation is not normally practically realizable. Additionally, the presence of water in minor amounts, e.g., less than about 10 vol %, typically between about 4–8 vol %, can beneficially reduce the possibility of undesired autoignition of the inflator assembly without significantly affecting the low temperature performance of the assembly.

It is also to be appreciated that various fuel materials can, if desired, be used mixed together. This is particularly true for those fuel materials, such as commercial grade butane, for which complete separation is not normally practically realizable. For example, fuel mixtures which have been used include: a) an alcohol mix containing about 80% ethyl alcohol, 8–10% methyl alcohol, and 4–8% water, with the balance constituting other various hydrocarbon species and b) an alkane mix containing about 90+% (e.g., about 95%) butane, 2–6% (e.g., about 4%) propane and with the balance constituting methane, ethane and other various trace hydrocarbon species. An example of such a fuel material is the denatured ethanol, "ANHYDROL SOLVENT SPECIAL, PM-4061, 190 Proof," sold by Union Carbide Chemicals and Plastics Company Inc.

Further, such fuels can be used in multi-phase combinations of two or more of the fuels in different states (e.g., gas, liquid, and solid). For example, the fluid fuel used can constitute a combination or mixture of a finely divided solid fuel in a liquid fuel, such as a starch in ethyl alcohol, for example. Similarly, the fluid fuel can constitute a combination or mixture of a gaseous fuel held in intimate contact with a liquid fuel. For example, such a gaseous fuel could be held in contact with the liquid fuel under pressure, similar in fashion to a carbonated beverage held in a container.

Fuel materials that can be quickly burned and consumed can be especially advantageous in the practice of the invention. In view thereof, preferred fuel materials for use in the practice of the invention can be of gaseous and liquid form. Specifically, the use of fuel gases such as hydrogen, methane and ethane, particularly homogeneous forms thereof, can result in enhanced rapid and complete combustion. Further, as energy used to effect vaporization, dispersion and atomization of liquid materials can be considered as losses that must be compensated for through the use of larger, more expensive and bulkier initiators the use of liquid forms of fuel materials having relatively high energy densities, low heats of vaporization and/or low surface tensions and viscosities can be advantageous as such materials generally require less energy to effect vaporization, dispersion and atomization. Thus, liquid fuel materials such as alcohols of no more than four carbon atoms, including ethyl alcohol such as the denatured ethanol materials identified herein, and $C_1$–$C_4$ paraffinic hydrocarbons can be used. In particular, as a result of properties such as a relatively small heat of vaporization and large heat of combustion, the use in the invention of a fuel material of butane (including normal butane, iso butane and mixtures thereof) can be particularly beneficial and desirable.

OXIDANTS AND OXIDANT MIXTURES

Oxidants useable in the invention include various oxygen-containing gases including, for example, pure oxygen, air, diluted air, and oxygen combined with one or more gas diluents such as nitrogen, carbon dioxide, and noble gases such as helium, argon, xenon. In practice, the use of pure oxygen ($O_2$) may be disadvantageous for a number of reasons including: 1) from a production viewpoint, such use may present handling difficulties, 2) such use can magnify autoignition difficulties, 3) when combined with the proper amounts of fuel (stoichiometric or near stoichiometric, $0.8 \leq \phi \leq 1.2$), extremely high flame temperatures can result (especially at the elevated pressures commonly associated with such inflator designs, and 4) at equivalence ratios of less than 0.8, excess quantities of oxygen can cause concern.

In view thereof, mixtures of argon and oxygen may be preferred. Argon advantageously is relatively: 1) inert, 2) inexpensive, 3) safe, and 4) easy to handle. The preferred relative amounts of the components of such a mixture will in general be dependent on factors such as the inflator geometry and the particular fuels used therein. For example, an oxidant mixture of 50–65 vol % oxygen with the balance being inert gas such as argon, helium or mixtures thereof can advantageously be used with ethyl alcohol-based fuel-containing assemblies.

It will also be appreciated that such oxidant mixtures can be used in conjunction with minor amounts of air, such as may be initially present in the chamber to be filled with oxidant, prior to the addition of the oxidant therein.

Further, with respect to oxidants used in conjunction with a finely divided solid fuel, while the above-described oxidants are useable therewith, an enriched-oxygen mixture at elevated pressures is believed preferred.

It is to be understood that reference to a mixture as having "enriched-oxygen" is relative to a mixture having an oxygen concentration similar to that of air. Thus, mixtures containing greater than about 21% oxygen are herein considered to be "enriched-oxygen" mixtures.

In the practice of the invention, such enriched-oxygen oxidant mixtures will generally be of a pressure in the range of about 500 to about 3000 psia (about 3.4 to about 20.7 MPa), preferably in the range of about 1600 to about 2200 psia (about 11.0 to about 15.2 MPa). Further, as described above, the oxygen can be mixed with an inert gas. In addition, the use of an oxidant mixture containing about 35 to 65% oxygen, about 2 to 15% helium, and with the balance constituting one or more inert gas (such as helium, argon, and nitrogen), either alone or in various relative amounts can be advantageous. For example, an oxidant mixture of about 60% oxygen, about 25% argon and about 15% helium can result in improved hot, cold and/or ignition delay performance as well as facilitate, during the manufacturing process, the detection of leaks from the device.

It is also to be appreciated that, if desired, the fuel material and oxidant can be stored together as a single material such as a hydroxyl ammonium nitrate-based liquid monopropellant. Such propellants are disclosed in U.S. Pat. 5,060,973, the disclosure of which is herein incorporated.

A particularly suitable liquid propellant composition containing both a fuel material and an oxidant material comprises, by mass, approximately 60% hydroxyl ammonium nitrate as an oxidizer, 20% triethanol ammonium nitrate as a fuel, and 20% water as a solvent.

It is to be appreciated that with a liquid propellant such as an aqueous solution of hydroxyl ammonium nitrate and a nitrated hydrocarbon salt, such as triethanol ammonium nitrate, the exothermically generated gases generally consist of nitrogen, carbon dioxide and water vapor, all of which are generally considered non-toxic. Furthermore, the combustion of such a propellant material generally results in no significant particulate by-product and thus preferably renders as unnecessary the post-combustion filtering of the products of combustion.

Thus, the invention permits the use of a wide range of fuels in a variety of forms (including gaseous, liquid, and solid, as well as mixtures thereof, including multi-phase combinations of two or more fuel materials) and a wide variety of oxidant species, and also a wide range of relative amounts of fuel and oxidant species.

In general, the inflator assemblies of the invention are preferably operated with equivalence ratios in the range of $0.4 \leq \phi \leq 1.6$, preferably in the range of $0.6 \leq \phi \leq 1.1$.

In one particular embodiment of the invention, the inner housing 84, in addition to containing or storing at least a second one or more fluid fuel materials additionally contains a supply of an oxidant material. Such additional oxidant can be useful in the combustion processing of the second one or more fuel materials stored in the housing such as when the combustion chamber does not itself initially contain a sufficient quantity of oxidant to effect the desired combustion of the first one or more fluid fuels contained within the combustion chamber 60 as well as the combustion of the second one or more fuel materials stored separately within the housing 84.

In one particular form of this embodiment, the inner housing 84 contains a fuel material and oxidant can be stored together as a single material such as the above-described hydroxyl ammonium nitrate-based liquid monopropellant, particularly one containing, by mass, approximately 60% hydroxyl ammonium nitrate as an oxidizer, 20% triethanol ammonium nitrate as a fuel, and 20% water as a solvent, for example.

In normal operation, such as upon the sensing of a collision, an appropriate signal is generally sent to the initiator device 82a and, such as described below, in some cases to the initiator device 82b. While such signals to the initiator devices 82a and 82b will in the practice of the invention typically be of or in an electrical form, other signal forms can, if desired, be used.

Through the proper timing and sequencing of the actuation or firing of the first and second initiator devices 82a and 82b, the mode of operation and the response obtained from an airbag system with the airbag inflator described herein can be adapted to meet the exigencies of various particular and specific airbag applications.

A. MODE 1

In accordance with this mode of operation, the inflator 10 is operated such that only the first initiator device 82a is actuated or fired, with the so operated inflator burning the first one or more fluid fuels while the second one or more fluid fuels is protected by the inner housing 84 and does not participate in the combustion reaction of between the first one or more fluid fuels and the one or more oxidants stored within the combustion chamber 60.

More specifically, the appropriately actuated initiator device 82a will, such as in a manner known in the art, initiate the combustion of the flammable mixture of the first one or more fluid fuels and oxidant mixture housed within the combustion chamber 60. The hot gas produced upon the burning of the flammable mixture results in a rapid pressure rise within the combustion chamber 60. When the gas pressure within the combustion chamber 60 exceeds the structural capability of the rupture disc 72, the disc ruptures or otherwise permits the passage of the hot gas through the gas exit opening 70 and into the storage chamber 14. Whereupon, the hot combustion gas expelled from the combustion chamber 60 mixes with the pressurized gas stored within the separate storage chamber 14 to produce inflation gas for use in inflating the inflatable device, e.g., an airbag. It will be appreciated that augmenting the combustion gas with the stored inert gas produces an inflation gas having both a lower temperature and reduced byproduct concentration (e.g., $CO$, $NO_x$, $H_2O$, etc.) than the combustion gas alone.

When the gas pressure within the storage chamber 14 exceeds the structural capability of the rupture disc 50, the disc ruptures or otherwise permits the passage of the inflation gas through the diffuser base portion 36 and into the diffuser cap portion 34 and thus allows this inflation gas to vent through the openings 46 into the airbag assembly.

As described, the flammable mixture stored within the combustion chamber 60 is ignited via operation of the first initiator device 82a. It will be appreciated that such an initiator device can be of any suitable type including: pyrotechnic, semi-conducting bridge (SCB), bridgewire, spark-discharge, heated or exploding wire or foil, through bulkhead (e.g., an initiator which discharges through a bulkhead such as in the form of a metal hermetic seal), for example. In general, the initiator device of such an assembly will preferably be of a pyrotechnic type as pyrotechnic initiator devices can advantageously provide relatively large energy outputs from relatively small sized packages and are commonly used in airbag inflator devices.

In accordance with this mode of operation of this embodiment of the invention, the contents of the inner housing 84, e.g., the stored or held supply of at least a second one or more fluid fuels, is protected by the inner housing 84 and does not participate in the combustion reaction of the first one or more fluid fuels and the one or more oxidants stored within the combustion chamber 60.

In one specific version of this embodiment of the invention, the flammable mixture of the first one or more fluid fuels and one or more oxidants are stored within the combustion chamber 60 in a manner to provide an initial mass flow rate of inflation gas, from the inflator and into the associated airbag, which is lower than that normally associated with airbag inflation. It will be appreciated that the production of such a reduced or relatively more gradual initial gas mass flow rate can be desired in certain circumstances such as, for example, when the occupant to be protected has been sensed to be out-of-position or the crash is of relatively low severity.

The provision of such a reduced rate of inflation gas output can be realized through the proper selection of the ratio of the first one or more fluid fuels to the one or more oxidants stored within the combustion chamber, the pressure of the flammable mixture stored within the combustion chamber and the amount of the first one or more fluid fuels, for example. It will be appreciated that the amount of fuel, the type of fuel and the pressure within the combustion chamber can be altered or varied to affect the rate of reaction between the fuel and the oxidant. Further, such changes in the reaction rate affect the mass flow from the inflator and the temperature of the combustion products discharged therefrom, which in turn affect the rate of inflation of the airbag cushion. Ultimately, the amount of fuel burned and the amount of oxidant affect the final pressure within the inflated airbag.

B. MODE 2

Under different circumstances, such as, for example, a high speed collision in which the occupant is seated in the proper position to be properly cushioned by the airbag, it can be advantageous for the inflator 10 to be operated such that both the initiator devices 82a and 82b are actuated or fired at or roughly at the same time.

With such operation, both the first one or more fluid fuels initially contained within the combustion chamber 60 and the second one or more fluid fuels initially contained within the housing 84 will be available to react and burn with oxidant in the combustion chamber to produce gaseous inflation products.

In accordance with such operation, at least a portion of the at least second one or more fluid fuels stored within the inner housing 84 is placed in fluid communication with the contents of the combustion chamber 60, with such added second one or more fluid fuels also reacting to form combustion products. For example, as described above, upon the receipt of an appropriate signal by the initiator device 82b, sufficient combustion products are produced and directed at the housing 84 to result in opening or rupturing thereof with at least a portion and, typically preferably, substantially all of the second one or more fluid fuels held therein being released into the combustion chamber 60 for subsequent combustion.

As with the initiator device 82, the initiator device 82b can also be of any suitable type including: pyrotechnic, semi-conducting bridge (SCB), bridgewire, spark-discharge, heated or exploding wire or foil, through bulkhead, for example. In practice, such use of pyrotechnic initiator devices is generally preferred for the reasons advanced above.

In one specific version of this embodiment of the invention, the reaction of the flammable mixture of a first one or more fluid fuels and one or more oxidants stored within the combustion chamber is tailored to occur in a fuel-lean manner. That is, the amount of oxidant is in a relatively large ratio to the amount of fuel or, alternatively, the equivalence ratio is relatively low. As a result, the amount of oxygen present within the combustion chamber 60 will be in excess of the amount of oxygen required for all of the first one or more fluid fuels stored within the combustion chamber to react, i.e., burn. The excess oxygen will then be available within the combustion chamber 60 to react with the second one or more fluid fuels released from the inner housing 84. As a result of the combustion of this second one or more fluid fuels, the rate of gas output from the inflator is greater.

C. OTHER

As will be appreciated, a wide range of responses intermediate between MODE 1 and MODE 2 operation are possible by way, for example, of adaptively selecting the time or operational interval between the actuation or firing of the initiator devices 82a and 82b.

For example, for a mild to moderate intensity collision in which the occupant is normally sized but out of proper position or in which the occupant, though in proper position, is of a significantly smaller than normal size, sequential operation of the initiator devices 82a and 82b can result in the airbag being deployed at an appropriately reduced speed.

Assuming that the initiator device 82b is fired subsequent to the firing of the initiator device 82a, the initiator device 82b may simply serve to open the housing 84 to release and, preferably, disperse at least a portion of the fuel therefrom in order to initiate the combustion of that fuel.

As a result of the combustion of the second one or more fluid fuels, an increased rate of gas output from the inflator can be realized. The combustion of the second one or more fluid fuels within the combustion chamber 60 can be sequenced and timed to occur at a selected time or operational interval following the initiation of the combustion of the first fuel. Such sequential operation can also be desirable for other airbag inflation occurrences such as the inflation of an airbag to protect an occupant who has been sensed to not be properly wearing a seat belt or in the instance of a severe or high speed collision, for example.

It will be appreciated that the first and second one or more fluid fuels utilized in the adaptive output inflator of the invention can be of: the same fuel materials, stored in the same or roughly the same quantities or loads; the same fuel materials, stored in different quantities or loads; or different fuel materials, stored in different quantities or loads, as may be desired.

For example, in one particular embodiment of the invention that may be advantageous with regards to fuel aging and certain specific safety concerns, the fluid fuel stored within the combustion chamber, i.e., the first fluid fuel, is butane and the fluid fuel stored within the inner housing, i.e., the second fluid fuel, is ethanol and is stored in the inner housing preferably free of combustion oxidant. More specifically, butane as compared to an alcohol such as ethanol, may be less susceptible to reaction with oxygen and thus better suited for use as a fuel material which is directly exposed to an oxidant.

Figure 2:
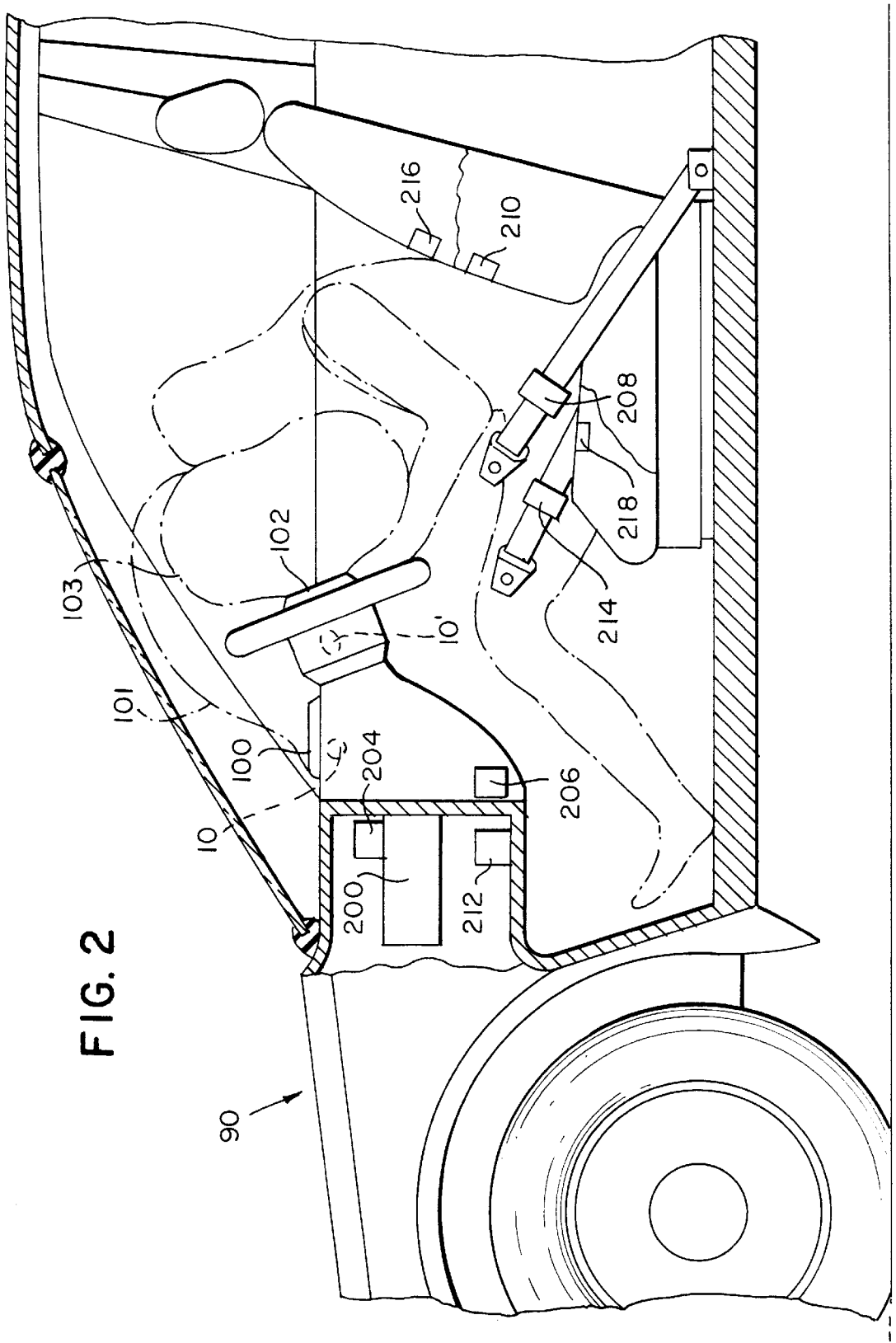
FIG. 2 is a simplified, partially in section, view of a vehicle including an airbag system incorporating the adaptive output fluid fueled airbag inflator of FIG. 1

Turning to FIG. 2, there is illustrated an airbag system 90 for use in conjunction with an automotive vehicle. The airbag system 90 is in many respects similar to the airbag system disclosed in U.S. Pat. 5,411,289, issued May 2, 1995, by Smith et el. and the disclosure of which is incorporated herein by reference.

The airbag system 90 includes, on the passenger side, an airbag module 100 including an airbag 101 and the adaptive output fluid fueled airbag inflator 10 and, on the driver side, an airbag module 102 including an airbag 103 and a corresponding adaptive output fluid fueled airbag inflator 10' in accordance with the invention, for a driver side application.

An electronic control unit (ECU) 200 and a plurality of sensors 204, 206, 208, 210, 212, 214, 216 and 218 are illustrated within the vehicle.

French patent application No. 92 09829 by Allard et al., filed Aug. 7, 1992 (corresponding to commonly assigned U.S. Pat. 5,346,249) discloses an airbag enclosure for a driver side airbag module as may be used with an adaptive output fluid fueled airbag inflator, in accordance with the invention, for the airbag module 100. Commonly assigned U.S. Pat. 5,407,226 by Lauritzen et al. discloses an airbag module of the type that can be used for the passenger side airbag module 102. The subject matter of the above-identified, commonly assigned U.S. patents are herein incorporated by reference.

The sensors include an acceleration sensor (ACCS) 204; a temperature sensor driver (TSD) 206; a temperature sensor passenger (TSP) 212; a buckle switch driver (BSD) 208; a buckle switch passenger (BSP) 214; an out-of-position sensor driver (OOPD) 210; an out-of-position sensor passenger (OOPP) 216 and an optional seat occupancy sensor passenger (SOSP) 218. Thermocouples or negative temperature coefficient (NTC) resistors can be used for the temperature sensors 206 and 212. Belt lock contacts with parallel and serial resistors for analog evaluation and fault detection possibility can be used for buckle switch sensors 208 and 214. A microwave radar sensor or similar device can be used for the out of position sensors 210 and 216. Capacitive sensor measuring stray capacitance between back rest and seating elements can be used as capacitance-electrodes for the seat occupancy sensor passenger 218. If desired, if an OOPP 216 is used, the SOSP 218 can be eliminated.

Further, it will be appreciated that a capacitance-sensor system, similar to that described above, can be sued to sense occupant size and/or weight. Thus, an array of sensors placed in the occupant seat or in the passenger compartment can be used to measure parameters such as the distance between, and possible contact of, the seat backrest and selected seating elements so that the weight and size of an occupant can be appropriately estimated or considered. For example, the control unit can be used to analyze the sensed or detected amount or extent of deflection of known seating elements (such as selected seat surfaces, for example) in relation to one another in order to determine the size and weight of an occupant.

The ECU 200 can advantageously be mounted in the vehicle interior, to better avoid the relatively harsh outside environment. In practice, the ECU 200 can be located near the driver or alternatively in the rear of the vehicle and preferably symmetrically located. It is to be understood that the actual location of the ECU 200 or the acceleration sensor 204 will generally be based on the preferred signal location for a specific vehicle application. The ECU 200 can contain a dual accelerometer, piezoelectric or silicon micro-machined type (ACCS) 204 for measuring the deceleration during an impact.

Figure 3:
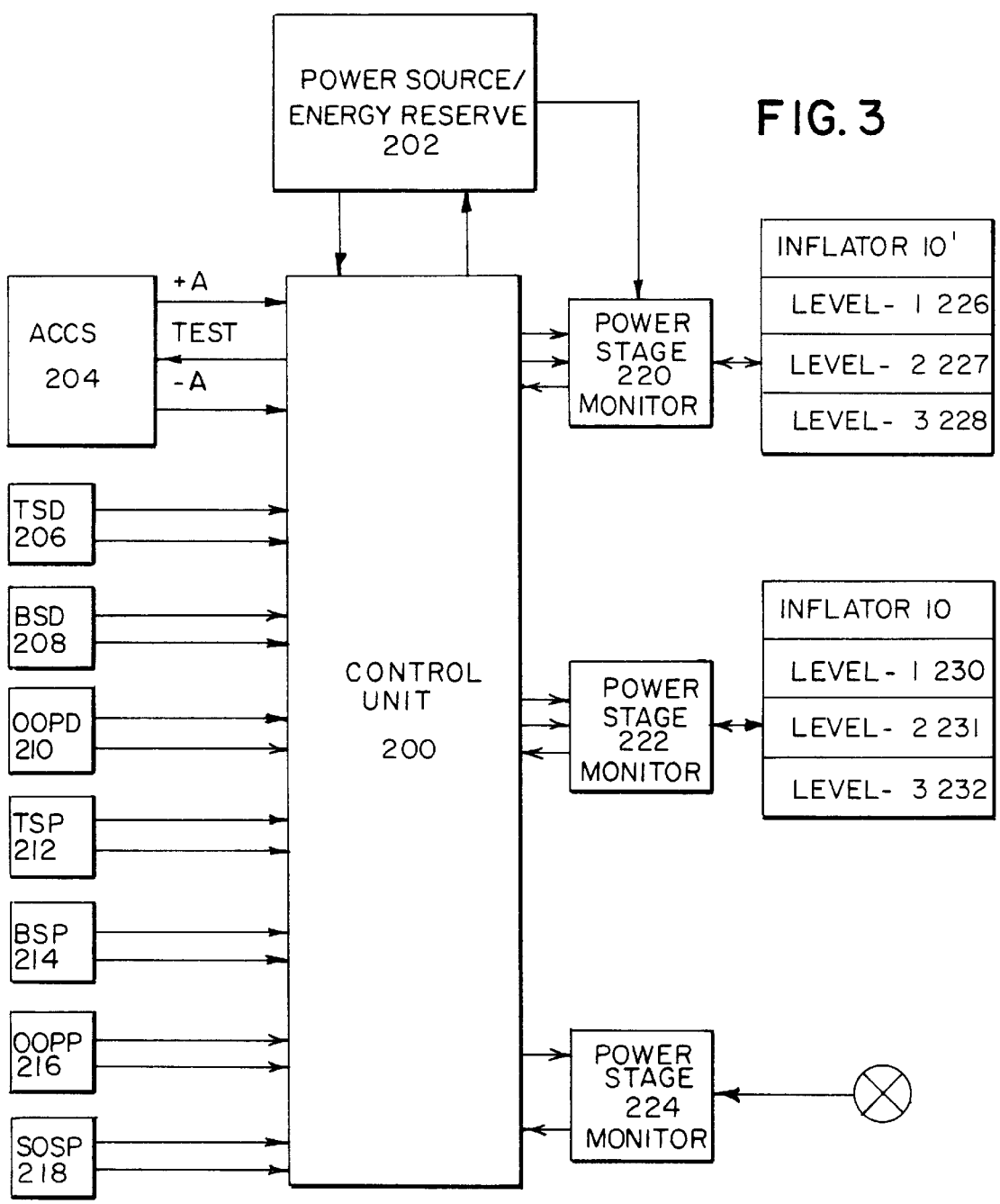
FIG. 3 is a block diagram representation of the airbag system of FIG. 2.

Now making additional reference to FIG. 3, a power source and energy reserve 202 coupled to the ECU 200 includes, for example, a 12 volt DC battery and a capacitor that is capable of supplying the unit with energy during a normal crash period, such as about 150 milliseconds. A plurality of power stages 220, 222 and 224 coupled to the ECU 200 are capable of supplying energy for actuating or firing commercially available pyrotechnic initiator devices such as can be used as the first and second initiator devices within the adaptive output fluid fueled inflators 10 and 10'.

Thus, the signals from each of the sensors are processed by a micro-controller or the electronic control unit (ECU) 200 to effect desired inflation of the airbags 101 and 103 of each of the modules 100 and 102, respectively, e.g., for the driver side, one of the output levels 226, 227 and 228 and, for the passenger side, one of the output levels 230, 231 and 232. The control unit, based on the sensed inputs thereinto, selects the most appropriate gas generation level and appropriate timing and sequencing of the actuation of the first and second initiator devices to tailor the performance of the system to the specifics of the particular crash incident.

Thus, upon receipt by a corresponding airbag module of a first level output signal from the sensor means, the first initiator device 82*a* is actuated to initiate the combustion of the first one or more fluid fuels and the supply of the second one or more fluid fuels is retained in the inner housing 84. More specifically, upon receipt of a first level output signal, the adaptive output inflator 10 would generally operate in the following manner:

a) the first one or more fluid fuels and the at least one oxidant are burned in the combustion chamber 60 to produce combustion products including hot combustion gas and increasing the temperature and pressure within the chamber 60;

b) when a predetermined increase in pressure within the combustion chamber 60 is realized, the disc 72 ruptures or otherwise opens to permit the release of hot combustion gas from the combustion chamber 60 into the gas storage chamber 14;

c) the hot combustion gas released from the combustion chamber 60 mixes with the pressurized stored gas in the gas storage chamber 14 to produce inflation gas; and d) when a predetermined increase in pressure within the gas storage chamber 14 is realized after the hot combustion gas released from the combustion chamber 60 has mixed with the pressurized stored gas to produce the inflation gas, the disc 50 ruptures or otherwise opens to permit the release of at least a portion of the inflation gas from the chamber 14 to inflate the inflatable device.

Upon receipt by a corresponding airbag module of a third level output signal from the sensor means, both the first initiator device 82*a* and the second initiator device 82*b* are actuated to initiate the combustion of the first and second one or more fluid fuels, respectively. More specifically, upon receipt of a third level output signal, the adaptive output inflator 10 would generally operate in the following manner:

a) the first one or more fluid fuels and the at least one oxidant are burned in the combustion chamber 60 to produce combustion products including hot combustion gas and increasing the temperature and pressure within the chamber 60;

b) the second one or more fluid fuels is released from the inner housing 84 into the combustion chamber 60 and also burned;

c) when a predetermined increase in pressure within the combustion chamber 60 is realized, the disc 72 ruptures or otherwise opens to permit the release of hot combustion gas from the combustion chamber 60 into the gas storage chamber 14;

d) the hot combustion gas released from the combustion chamber 60 mixes with the pressurized stored gas in the gas storage chamber 14 to produce inflation gas; and e) when a predetermined increase in pressure within the gas storage chamber 14 is realized after the hot combustion gas released from the combustion chamber 60 has mixed with the pressurized stored gas to produce the inflation gas, the disc 50 ruptures or otherwise opens to permit the release of at least a portion of the inflation gas from the chamber 14 to inflate the inflatable device.

Also, it will be understood that a wide range of responses intermediate between these are possible upon receipt by a corresponding airbag module of an appropriate output from the sensor means. For example, upon receipt by a corresponding airbag module of a second level output signal from the sensor means (e.g., such second level output typically being intermediate between the above identified first and third level outputs), the second initiator device 82*b* is actuated only after the passage or attainment of a selected time or operational interval following actuation of the first initiator device 82*a*.

It is also to be appreciated that various modifications of the above-described inflator device are possible.

Figure 4:
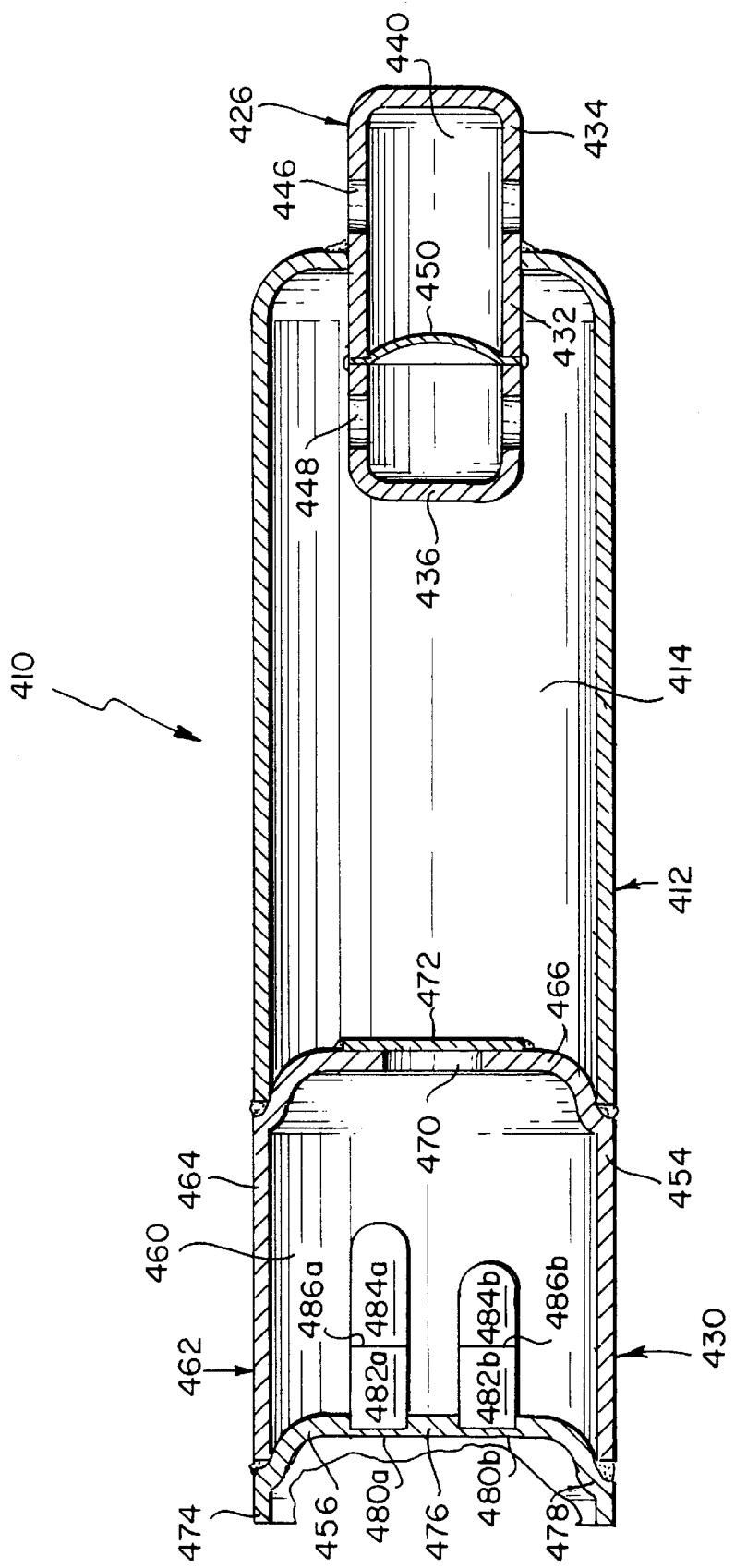
FIG. 4 is a simplified, partially in section, schematic drawing of an adaptive output fluid fueled airbag inflator in accordance with an alternative embodiment of the invention.

For example, FIG. 4 illustrates an adaptive output fluid fueled airbag inflator 410 in accordance with an alternative embodiment of the invention. The inflator 410 is generally similar to the inflator 10 described above and includes a pressure vessel 412, a gas storage chamber 414, a diffuser assembly 426, and a combustion chamber assembly 430.

As with the gas storage chamber 14 in the above-described inflator assembly 10, the gas storage chamber 414 is preferably filled and pressurized with a stored gas such as an inert gas such as argon or nitrogen and, if desired, may also include an oxidant such as oxygen gas, for example.

The diffuser assembly 426 comprises a generally cylindrical sleeve 432 having a cap portion 434 and a base portion 436 to define a diffuser chamber 440. The diffuser assembly cap portion 434 includes a plurality of openings 446 for dispensing and directing inflation gas from the inflator assembly into an airbag assembly (not shown). The diffuser assembly base portion 436 additionally includes a plurality of openings 448 for passage of contents from the storage chamber 414, into the diffuser chamber 440.

The diffuser assembly 426 also similarly includes a rupture disc 450 is joined in sealing relation with the diffuser assembly cap and base portions, 434 and 436. In the static state, the disc 450 serves to separate the contents of the storage chamber 414 from the airbag.

The combustion chamber assembly 430 comprises a cap portion 454 and a base portion 456 to define a combustion chamber 460. The combustion chamber cap portion 454 includes a sleeve 462, constituting a side wall 464 with a dome 466 joined thereto. The combustion chamber dome 466 includes an orifice, referred to herein as a gas exit opening 470. The gas exit opening 470 is normally closed by sealing means, e.g., by means of a rupture disc 472.

The combustion chamber base portion 456 includes a base ring 474 with a cap 476 joined thereto via a base shoulder connecting portion 478.

The base cap 476 includes first and second openings, 480a and 480b, respectively, wherethrough first and second initiator devices, 482a and 482b, respectively, and described in greater detail below, are attached in sealing relation, such as with a weld, crimping or other suitable hermetic seal, within the combustion chamber 460.

The inflator assembly 410, however, differs from the assembly 10 in that the assembly 410 includes two, rather than one, container or inner housing, i.e., first and second containers or inner housings 484a and 484b, respectively, within the combustion chamber 460. Such containers or inner housings can, as described above, be of the type of fluid fuel-containing initiator device shown and described in he above-identified, commonly assigned U.S. Pat. 5,531, 473, or containment assembly disclosed in patent application Ser. No. 08/572,452, filed on Dec. 14, 1995.

Within the combustion chamber 460, there is typically housed one or more oxidant materials, typically in gaseous form. Optionally, if desired, one or more inert gases can also be stored therein.

Within the first container 484a, in the static state, there is stored or held at least a first one or more fluid fuels. Within the second container 484b, in the static state, there is stored or held a second one or more fluid fuels. The inner housings 484a and 484b are preferably arranged adjacent and proximate to the discharge ends 486a and 486b, respectively, of the initiator devices 482a and 482b such that upon actuation of the initiator device 482a and 482b, such as containing a charge of igniter material, sufficient combustion products are produced and directed at the respective housing to result in opening or rupturing thereof with the second one or more fluid fuels held therein being released into the combustion chamber 60 for subsequent combustion.

It is to be appreciated that, either or both the first and second containers 484a and 484b can, if desired, hold the respective supply of fuel thereof free of combustion oxidant, as described above.

Also, either or both the first and second containers 484a and 484b can, if desired, in addition to fuel materials contain an oxidant material. As described above, the fuel material and oxidant can be stored together as a single material such as a hydroxyl ammonium nitrate-based liquid monopropellant such as a liquid propellant composition containing both a fuel material and an oxidant material comprising, by mass, approximately 60% hydroxyl ammonium nitrate as an oxidizer, 20% triethanol ammonium nitrate as a fuel, and 20% water as a solvent, as disclosed in U.S. Pat. 5,060,973.

Operation of the adaptive output fluid fueled airbag inflator 410 is generally similar to operation of the inflator 10 described above. It is to be appreciated that while the invention has been described above relative to operational embodiments having a wide range of responses, either or both the adaptive inflator of the invention and its operation can be designed to provide an inflation gas output in a selected, limited number of discrete levels.

For example, the inflator 410 can be operated such that only the first initiator device 482a is actuated or fired. The initiator device 482a produces a discharge whereby the first container 484a is ruptured or otherwise opened to release at least a portion of the supply of the first one or more fluid fuels stored therewithin into the combustion chamber 460. The so operated inflator 410 proceeds to burn at least a portion of the first one or more fluid fuels and the at least one oxidant in the combustion chamber 460 while the second one or more fluid fuels is protected by the inner housing 484b and does not participate in the combustion reaction. The combustion of first one or more fluid fuels produces combustion products including hot combustion gas and increasing the temperature and pressure within the chamber 460. When a predetermined increase in pressure within the combustion chamber 460 is realized, the disc 472 ruptures or otherwise opens to permit the release of hot combustion gas from the combustion chamber 460 into the gas storage chamber 414. The hot combustion gas released from the combustion chamber 460 mixes with the pressurized stored gas in the gas storage chamber 414 to produce inflation gas. When a predetermined increase in pressure within the gas storage chamber 414 is realized after the hot combustion gas released from the combustion chamber 460 has mixed with the pressurized stored gas to produce the inflation gas, the disc 450 ruptures or otherwise opens to permit the release of at least a portion of the inflation gas from the chamber 414 to inflate the inflatable device.

Alternatively, the inflator 410 can be operated such that only the second initiator device 482b is actuated or fired. In accordance with such operation, the second initiator device 482b produces a discharge whereby the second container 484b is ruptured or otherwise opened to release at least a portion of the supply of the second one or more fluid fuels stored therewithin into the combustion chamber 460. The so released second one or more fluid fuels is then burned while the first one or more fluid fuels is protected by the inner housing 484a and does not participate in the combustion reaction between the second one or more fluid fuels and the one or more oxidants within the combustion chamber 460.

The combustion of second one or more fluid fuels produces combustion products including hot combustion gas and increasing the temperature and pressure within the chamber 460. Again, when a predetermined increase in pressure within the combustion chamber 460 is realized, the disc 472 ruptures or otherwise opens to permit the release of hot combustion gas from the combustion chamber 460 into the gas storage chamber 414. The hot combustion gas released from the combustion chamber 460 mixes with the pressurized stored gas in the gas storage chamber 414 to produce inflation gas. When a predetermined increase in pressure within the gas storage chamber 414 is realized after the hot combustion gas released from the combustion chamber 460 has mixed with the pressurized stored gas to produce the inflation gas, the disc 450 ruptures or otherwise opens to permit the release of at least a portion of the inflation gas from the chamber 414 to inflate the inflatable device.

The inflator 410 can also be operated such that both the initiator devices 482a and 482b are both actuated or fired, either substantially simultaneously or sequentially with one selected to be fired first followed at selected time or operational interval by the firing of the other (previously unfired) initiator device, as may be specifically desired, and as described above relative to the inflator 10.

It will be appreciated that where the housings 484a and 484b are opened sequentially and housings of two different sizes are used, it will generally be desirable that the smaller housing be used for the housing that is to open last. Such a smaller sized housing will typically be better able to withstand the relatively large pressures which can be generated in the combustion chambers of such inflation devices.

It is to be appreciated that the adaptive output fluid fueled inflators, such as described above, in combination with an appropriate sensor system can be used to adjust the inflation performance characteristics of a corresponding airbag based on parameters such as the ambient temperature, occupant's presence (including occupant size, weight, and/or position), seat belt usage and deceleration of the motor vehicle (e.g., severity of the collision).

The present invention is described in further detail in connection with the following examples which illustrate/simulate various aspects involved in the practice of the invention. It is to be understood that all changes that come within the spirit of the invention are desired to be protected and thus the invention is not to be construed as limited by these examples.

EXAMPLES

In each of the following examples, a heavyweight reusable passenger side sized test inflator similar in design to the inflator 410 shown in FIG. 4 was used. The test inflator had a 30 cubic inch inert gas storage chamber 414 filled to contain 116 grams of a 90 vol % argon and 10 vol % helium gas mixture. The combustion chamber 460 was filled to contain 16 grams of a 60 vol % oxygen, 25 vol % argon, and 15 vol % helium gas mixture. The first inner housing 484a was filled to contain a 2.45 gram load of ethyl alcohol. The inner housing 484b was filled to contain a 1.05 load of ethyl alcohol.

Figure 5:
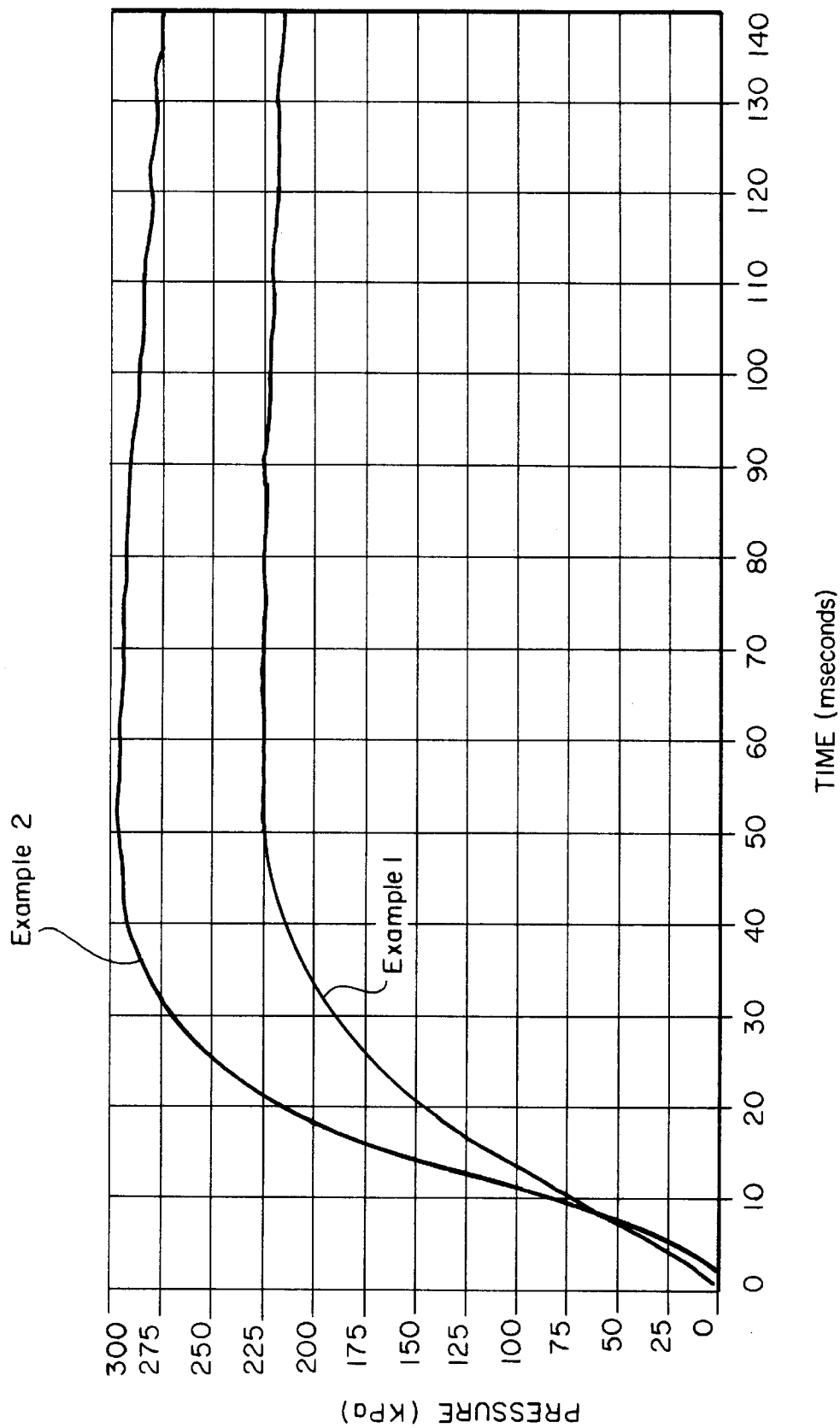
FIG. 5 shows the tank pressure as a function of time performance obtained in the Examples with an adaptive output fluid fueled airbag inflator, in accordance with the invention, illustrating various selected aspects of the invention.

For each example, the test inflator was operated in the manner described, with the inflator fired into a rigid tank having a volume of 100 liters. In each example, the tank pressure as a function of time was monitored via pressure transducers and the results are shown in FIG. 5.

EXAMPLE 1

In this example, the above-described test inflator was fired only actuating the first initiator device 482a and thus only burning fuel contained within the first inner housing 484a, while the second inner housing 484b remained intact and thus the fuel contained therewithin did not participate in the reaction. Such operation produced an equivalence ratio of 0.50 within the combustion chamber upon the opening of the first inner housing.

EXAMPLE 2

In this example, the above-described test inflator was fired actuating substantially simultaneously both the first and second initiator devices 482a and 482b.

As a result, fuel which had been contained within both the first and second inner housings, 484a 484b, respectively, was burned. Such operation produced an equivalence ratio of 0.71 within the combustion chamber

RESULTS

FIG. 5 presents the tank pressure as a function of time obtained in Examples 1 and 2. These examples show that a single inflator assembly, in accordance with the invention, can provide 2 or more discrete levels of performance, e.g., vary the rate and amount of inflation gas produced thereby.

Thus, in accordance with the invention, there has been provided an airbag system which, from a single source and dependent on appropriately selected operating conditions, can effectively and efficiently produce airbag inflation gas at a rate and/or pressure selected from a wide range of possible responses. Further, there has been provided an inflator apparatus, an airbag system or a method of operation of an adaptive output airbag inflator in an airbag system for a motor vehicle which, if desired, can be simply appropriately designed to provide an inflation gas output in a selected, limited number of discrete levels.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An adaptive output inflator apparatus for inflating an inflatable device, said apparatus comprising:

a first chamber wherein a supply of a first fuel in the form of a fluid and at least one oxidant are burned to produce combustion products including hot combustion gas and to increase the temperature and pressure within said first chamber, said first chamber adapted to open when a predetermined increase in pressure within said first chamber is realized, whereby at least a portion of the hot combustion gas is released from said first chamber, a second chamber containing a supply of pressurized stored gas, said second chamber in fluid communication with said first chamber upon the opening of said first chamber, the hot combustion gas released from said first chamber mixing with the pressurized stored gas to produce inflation gas and to increase the temperature and pressure within said second chamber, said second chamber adapted to open when a predetermined increase in pressure within said second chamber is realized after the hot combustion gas released from said first chamber mixes with the pressurized stored gas to produce the inflation gas, whereby at least a portion of the inflation gas is released from said second chamber to inflate the inflatable device, a first initiator device for initiating the combustion of the first fuel and the at least one oxidant, and a combination including,
      a second container containing a supply of a second fuel in the form of a fluid, said second container adapted to open to be in fluid communication with said first chamber, and
      a second initiator device for initiating the combustion of the second fuel and the at least one oxidant.

2. The apparatus of claim 1 additionally comprising a first container containing the supply of the first fuel in the form of a fluid, said first container adapted to open to be in fluid communication with said first chamber.

3. The apparatus of claim 2 wherein said first initiator device produces a discharge whereby said first container is opened to release at least a portion of the supply of the first fuel therefrom into said first chamber.

4. The apparatus of claim 2 wherein at least one of said first and said second containers holds the supply of fuel thereof free of combustion oxidant.

5. The apparatus of claim 1 wherein the second fuel and a second oxidant are stored together within said second container.

6. The apparatus of claim 5 wherein the second fuel and the second oxidant are stored together within said second container as a single material.

7. The apparatus of claim 6 wherein the single material comprises a hydroxyl ammonium nitrate-based liquid monopropellant.

8. In an airbag system for a motor vehicle, the system comprising at least one airbag module containing at least one inflatable airbag and sensor means for sensing at least one airbag system operating condition selected from the group of ambient temperature, occupant presence, seat belt usage and deceleration of the motor vehicle, the improvement comprising:
 an adaptive output airbag inflator, coupled to the at least one airbag module, for generating an adaptive output of inflation gas to the airbag module, said adaptive output airbag inflator comprising:
 a first chamber wherein a supply of a first fuel in the form of a fluid and at least one oxidant are burned to produce combustion products including hot combustion gas and to increase the temperature and pressure within said first chamber, said first chamber adapted to open when a predetermined increase in pressure within said first chamber is realized, whereby at least a portion of the hot combustion gas is released from said first chamber,
 a second chamber containing a supply of pressurized stored gas, said second chamber in fluid communication with said first chamber upon the opening of said first chamber, the hot combustion gas released from said first chamber mixing with the pressurized stored gas to produce inflation gas and to increase the temperature and pressure within said second chamber, said second chamber adapted to open when a predetermined increase in pressure within said second chamber is realized after the hot combustion gas released from said first chamber mixes with the pressurized stored gas to produce the inflation gas, whereby at least a portion of the inflation gas is released from said second chamber to inflate the inflatable device,
 a first initiator device for initiating the combustion of the first fuel and the at least one oxidant, and
 a combination including,
  a second container for holding a supply of a second fuel in the form of a fluid, said second container adapted to open to be in fluid communication with said first chamber, and
  a second initiator device for initiating the combustion of the second fuel and the at least one oxidant;
 wherein, upon receipt by the module of a first level output signal from the sensor means, said first initiator device is actuated to initiate the combustion of the first fuel and the supply of the second fuel is retained in said second container, and
 wherein, upon receipt by the module of a third level output signal from the sensor means, both said first initiator device and said second initiator device are actuated to initiate the combustion of the first fuel and the second fuel, respectively.

9. The airbag system of claim 8 wherein, upon receipt by the module of a second level output signal from the sensor means, said second initiator device is actuated only after the passage of a predetermined interval of time subsequent to actuation of said first initiator device.

10. The airbag system of claim 8 additionally comprising a first container for holding the supply of the first fuel, said first container adapted to open to be in fluid communication with said first chamber.

11. The airbag system of claim 10 wherein said first initiator device produces a discharge whereby said first container is opened to release the first fuel therefrom into said first chamber.

12. The airbag system of claim 10 wherein at least one of said first and said second containers holds the supply of fuel thereof free of combustion oxidant.

13. The airbag system of claim 8 wherein the second fuel and a second oxidant are stored together within said second container.

14. The airbag system of claim 13 wherein the second fuel and the second oxidant are stored together within said second container as a single material.

15. The airbag system of claim 14 wherein the single material comprises a hydroxyl ammonium nitrate-based liquid monopropellant.

16. A method of operation of an adaptive output airbag inflator in an airbag system for a motor vehicle, the system comprising at least one airbag module containing at least one inflatable airbag and sensor means for sensing at least one airbag operating condition selected from the group of ambient temperature, occupant presence, seat belt usage and deceleration of the motor vehicle, the airbag inflator having:
 a first chamber wherein a supply of a first fuel in the form of a fluid and at least one oxidant are burned to produce combustion products including hot combustion gas and to increase the temperature and pressure within the first chamber, the first chamber opening when a predetermined increase in pressure within the first chamber is realized, whereby at least a portion of the hot combustion gas is released from the first chamber,
 a second chamber containing a supply of pressurized stored gas, the second chamber in fluid communication with the first chamber upon the opening of the first chamber, the hot combustion gas released from the first chamber mixing with the pressurized stored gas to produce inflation gas and to increase the temperature and pressure within said second chamber, said second chamber opening when a predetermined increase in pressure within the second chamber is realized after the hot combustion gas released from the first chamber mixes with the pressurized stored gas to produce the inflation gas, whereby at least a portion of the inflation gas is released from the second chamber to inflate the inflatable device,
 a first initiator device for initiating the combustion of the first fuel and the at least one oxidant, and
 a combination including,
  a second container holding a supply of a second fuel in the form of a fluid, the second container adapted to open to be in fluid communication with the first chamber, and
  a second initiator device for initiating the combustion of the second fuel,
 wherein:
  1) in response to receipt by the module of a first level output signal from the sensor means, said method comprises the steps of:
   burning the first fuel and the at least one oxidant in the first chamber to produce combustion products including hot combustion gas and increasing the temperature and pressure within the first chamber, opening the first chamber when a predetermined increase in pressure within the first chamber is realized to release hot combustion gas from the first chamber into the second chamber, mixing the released hot combustion gas with the pressurized stored gas in the second chamber to produce inflation gas, opening the second chamber when a predetermined increase in pressure within the second chamber is realized after the hot combustion gas released from the first chamber has mixed with the pressurized stored gas to produce the inflation gas to release at least a portion of the inflation gas from the second chamber to inflate the inflatable device; and 2) in response to receipt by the module of a third level output signal from the sensor means, said method comprises the steps of:

burning the first fuel and the at least one oxidant in the first chamber to produce combustion products including hot combustion gas and increasing the temperature and pressure within the first chamber, releasing the second fuel into the first chamber from the second container, burning the second fuel and an oxidant in the first chamber to produce additional combustion products including additional hot combustion gas, the burning of the first fuel and the burning of the second fuel increasing the temperature and pressure within the first chamber, opening the first chamber when a predetermined increase in pressure in the first chamber is realized to release hot combustion gas from the first chamber into the second chamber, mixing the released hot combustion gas with the pressurized stored gas in the second chamber to produce inflation gas, opening the second chamber when a predetermined increase in pressure within the second chamber is realized, releasing combustion products produced from the combustion of the first fuel and additional combustion products produced from the combustion of the second fuel and the at least one oxidant from the first chamber into the second chamber, mixing at least the released combustion products with the pressurized stored gas in the second chamber to produce inflation gas, opening the second chamber when a predetermined increase in pressure within the second chamber is realized to release at least a portion of the inflation gas from the second chamber to inflate the inflatable device.

17. The method of claim 16 wherein the supply of the first fuel is initially held in a first container and wherein in response to receipt by the module of either a first or a third level output signal from the sensor means, the method additionally comprises the step of releasing the first fuel from the first container into the first chamber whereby said burning of the first fuel and the at least one oxidant in the first chamber occurs.

18. The method of claim 16 wherein, upon receipt by the module of a second level output signal from the sensor means, said method comprises the steps of:

burning the first fuel and the at least one oxidant in the first chamber to produce combustion products including hot combustion gas and increasing the temperature and pressure within the first chamber, releasing the second fuel into the first chamber from the second container only after the passage of a predetermined interval of time subsequent to the initiation of the burning of the first fuel and oxidant in the first chamber, burning the second fuel in the first chamber to produce additional combustion products including additional hot combustion gas, the burning of the first fuel and the burning of the second fuel increasing the temperature and pressure within the first chamber, opening the first chamber when a predetermined increase in pressure in the first chamber is realized to release hot combustion gas from the first chamber into the second chamber, mixing the released hot combustion gas with the pressurized stored gas in the second chamber to produce inflation gas, opening the second chamber when a predetermined increase in pressure within the second chamber is realized, releasing combustion products produced from the combustion of the first fuel and additional combustion products produced from the combustion of the second fuel from the first chamber into the second chamber, mixing at least the released combustion products with the pressurized stored gas in the second chamber to produce inflation gas, opening the second chamber when a predetermined increase in pressure within the second chamber is realized to release at least a portion of the inflation gas from the second chamber to inflate the inflatable device.

19. The method of claim 18 wherein, upon receipt by the module of a second level output signal from the sensor means, said opening of the first chamber precedes said releasing of the second fuel into the first chamber from the second container.

20. The method of claim 19 wherein prior to said releasing of the second fuel into the first chamber from the second container, the second container additionally contains a supply of a second oxidant.

21. The method of claim 20 wherein prior to said releasing of the second fuel into the first chamber from the second container, the second container contains the second fuel and the second oxidant as a single material.

22. The method of claim 21 wherein the single material comprises a hydroxyl ammonium nitrate-based liquid monopropellant.

23. The method of claim 22 wherein the supply of the first fuel is initially held in a first container and wherein in response to receipt by the module of either a first, second or third level output signal from the sensor means, the method additionally comprising the step of releasing the first fuel from the first container into the first chamber whereby said burning of the first fuel occurs.

* * * * *